M. G. HUBBARD.
Harvester.
No. 23,029.
Patented Feb. 22, 1859.
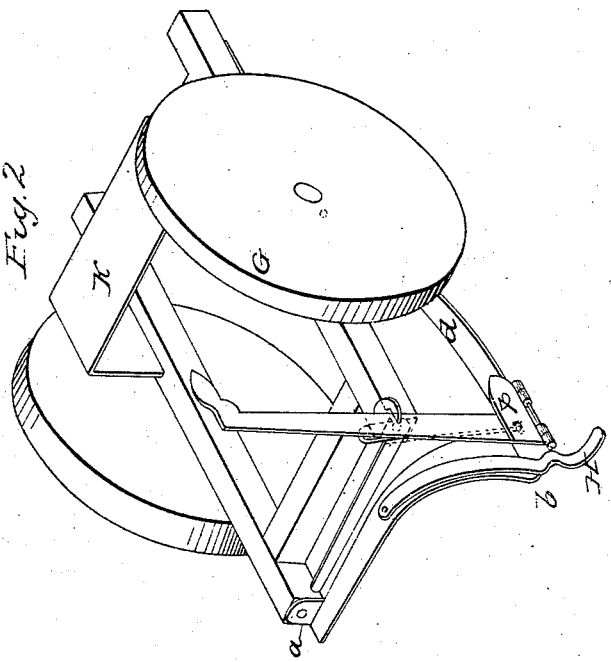
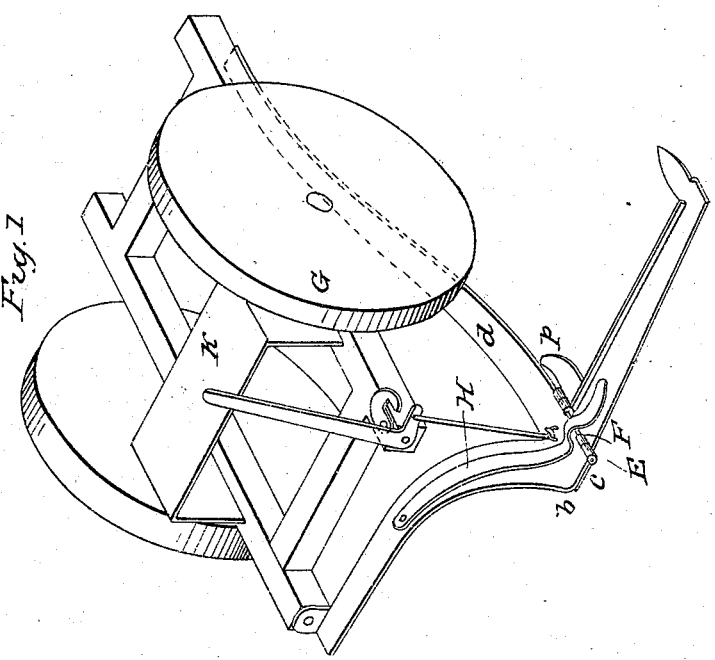
INVENTOR
M G Hubbard

UNITED STATES PATENT OFFICE.

M. G. HUBBARD, OF PENN YAN, NEW YORK.

IMPROVEMENT IN HARVESTERS.

Specification forming part of Letters Patent No. 23,029, dated February 22, 1859.

*To all whom it may concern:*

Be it known that I, M. G. HUBBARD, of Penn Yan, Yates county, New York, have invented certain new and useful Improvements in Mowing-Machines, of which the following is a full, clear, and exact description, reference being had to the drawings illustrative thereof.

The improvements herein described consist in a new method of arranging and attaching the cutting apparatus to my well-known two-wheeled mowing-machine, and an improved arrangement of the machine for transportation.

I have labored incessantly to accomplish in the attachment of the cutting apparatus the most simple method of attaining a yielding and self-adjusting combination for uneven surfaces which would limit the inner end of the cutting apparatus within a certain range of movement, so as to preserve a proper action of the pitman under all circumstances, and yet allow the outer end of the cutting apparatus to be flexible and free for mowing along ridges and over knolls, and which, when required for mowing over sudden inequalities and stony land, an elastic force could also be applied to the outer end, so that either end of the cutting apparatus, when passing over any small obstacle in the grass, would be brought quickly to the ground and therefore lose but little grass. This last feature was perfectly attained in the device patented by me January 27, 1857; but the plan which is herein described, while it retains the quality of elasticity at the inner end of the cutting apparatus, which is always desirable, as it will at all times hold the inner end to the ground with sufficient freedom and range of vertical movement to enable it to follow any ordinary surface that the supporting-wheel could run over, it also at the same time admits of perfect freedom of the outer end of the cutting apparatus when desired, and produces an elastic force upon it when necessary.

It will be observed that the rise and fall of the machine renders it unnecessary to attain such perfect freedom of the inner end of the cutting apparatus to rise and fall as is sometimes required for the outer end, and it would be objectionable because it might sometimes throw the pitman too much out of line for perfect action. Now, as the rise and fall of the machine renders it practicable to limit the range of vertical movement of the inner end of the cutting apparatus; and as the proper action of the pitman renders such a limit desirable, and an elastic force being always desirable upon the inner end of the cutting apparatus, and as it is generally desirable to have an elastic force operating upon the outer end, but sometimes impracticable, I have changed the construction of my machine to the following plan, with the view of attaining all these advantages in one simple combination and arrangement of parts. In my new plan I hinge the inner end of the finger-bar to the projecting end of the left-side sill, as seen at *a* in Figure 1, and this bar is bent on a gradual curve down to the ground at *b*, where it is strongly connected to the spring *d*, which passes up and is bolted to the front end of the machine. The "wear-plate" *c* is bolted firmly under the spring *d* and locked onto the finger-bar, and is connected with the inner shoe, P, by the hinge-joints E and F, and the projecting portion of the finger-bar, which is made separate from the curved portion, is firmly secured to the said inner shoe, which is located directly behind the supporting-wheel G and runs in the path thereof. This arrangement of the wear-plate *c* and spring *d*, and their connection with the finger-bar, and the location of the inner shoe, and their general construction are the same as described in Letters Patent issued to me February 9, 1858, in which their general relations and purposes are more fully described. But by making the connection between the inner shoe and the wear-plate in the form of a hinge, perfect flexibility and freedom of the outer end of the cutting apparatus may be attained, and which, as previously mentioned, is sometimes desirable; but for general use I find it expedient to cause an elastic force of about ten pounds to operate upon both ends of the cutting apparatus, in order to bring it quickly to the ground when passing over small obstacles in the grass. In order to accomplish this I graduate the heavy and strong spring *d* so that on level ground it will press down with a force of about twenty pounds, and I attach an auxiliary spring, as seen at H, to the curved portion of the finger-bar, and extend this spring out onto the cutting apparatus beyond the hinge-joint, so as to create an elastic force upon the outer end of the cutting apparatus equal to about ten pounds, and the action of this spring takes off about ten pounds of the force of the spring *d*, leaving about ten pounds of elastic force acting upon both ends of the cutting apparatus. It will thus be seen that by hinging the curved portion of the finger-bar at $a$ and connecting it firmly to the rear end of the spring $d$ a slightly elastic and yielding corner is attained, forming an angle of great strength for the attachment of the projecting portion of the finger-bar or cutting apparatus, and by making this attachment in the form of a hinge, as described, both ends of the cutting apparatus are made yielding, so that the whole or either end thereof may rise or fall in conforming to uneven surfaces, and with this arrangement the outer end of the cutting apparatus is rendered perfectly independent vertically, while the inner end is confined within the range of vertical movement required for the proper action of the pitman by the heavy spring $d$, which is made sufficiently strong to sustain the inner end of the cutting apparatus when it drops to the lowest point of descent practicable for a proper action of the pitman.

Many attempts have been made by others as well as myself to form a yielding cutting apparatus by hinging it at its inner end to the machine; but it is found by experience that a perfectly-free hinge is only adapted to certain kinds of surfaces—such as smooth surfaces with gradual undulations—and that for sudden inequalities a cutting apparatus in any way hinged freely to the machine is exceedingly objectionable on account of the liability to bound in passing over them, and therefore drag down and waste the grass, while I have discovered that a few pounds of elastic force acting upon each end of the cutting apparatus not only overcomes the objection of "bounding," but actually returns the cutters to the ground much quicker than any rigid finger-bar or hinged finger-bar that I have ever seen. In order to have this elastic force upon both ends of the cutting apparatus when desired, and the perfect freedom of the outer end of the cutting apparatus when desired, I attach the spring H with only one bolt, so that it can at any time be swung around and not act upon the cutting apparatus, and this is also necessary in order to permit the cutting apparatus to be turned up for transportation, as seen in Fig. 2, which shows the machine as arranged for transportation. In this position the shifting seat K is thrown forward, so that the weight of the driver will balance the weight of the cutting apparatus, and thus the machine will bear more evenly upon the horses. This feature renders it necessary that the seat K should be so attached to the machine that it can readily be thrown forward for transportation or back for use, in order to preserve a proper balance of the machine in both cases, which is a feature of great importance, and it cannot be conveniently attained without locating the cutting apparatus at the rear end of the machine, as described, because the weight of the driver is needed on the rear end of the machine to balance it while at work; and if the cutting apparatus is located at the rear end of the machine when it is folded up for transportation, the driver's seat may be thrown forward, and thus the proper balance of the machine is maintained under all circumstances.

Having thus fully described my apparatus and its purposes, what I claim as my invention, and desire to secure by Letters Patent, is—

1. The combination of the curved portion of the finger-bar, hinged at $a$, with the spring $d$, forming a yielding and elastic corner or point of attachment of sufficient strength to securely connect the cutting apparatus thereto, substantially as and for the purposes set forth.

2. The auxiliary adjustable spring H, or its equivalent, substantially as and for the purposes described.

M. G. HUBBARD.

Witnesses:
  O. WATT,
  S. LEWIS.